US012494000B2

(12) United States Patent
Verma et al.

(10) Patent No.: US 12,494,000 B2
(45) Date of Patent: Dec. 9, 2025

(54) REAL TIME PATTERN PREVIEW GENERATION

(71) Applicant: Adobe Inc., San Jose, CA (US)

(72) Inventors: Abhishek Verma, New Delhi (IN); Arihant Jain, Noida (IN); Holger Winnemoeller, Seattle, WA (US)

(73) Assignee: Adobe Inc., San Jose, CA (US)

( * ) Notice: Subject to any disclaimer, the term of this patent is extended or adjusted under 35 U.S.C. 154(b) by 258 days.

(21) Appl. No.: 18/196,854

(22) Filed: May 12, 2023

(65) Prior Publication Data

US 2024/0378766 A1 Nov. 14, 2024

(51) Int. Cl.
*G06T 11/00* (2006.01)
*G06T 5/20* (2006.01)
*G06T 5/70* (2024.01)
*G06T 7/13* (2017.01)
*G06T 7/55* (2017.01)
*G06T 7/90* (2017.01)

(52) U.S. Cl.
CPC .............. *G06T 11/001* (2013.01); *G06T 5/20* (2013.01); *G06T 5/70* (2024.01); *G06T 7/13* (2017.01); *G06T 7/55* (2017.01); *G06T 7/90* (2017.01); *G06T 2200/24* (2013.01); *G06T 2207/10024* (2013.01)

(58) Field of Classification Search
CPC . G06T 11/001; G06T 7/55; G06T 7/13; G06T 7/90; G06T 5/20; G06T 5/70; G06T 2200/24; G06T 2207/10024; G11B 27/031; G11B 27/034; G11B 27/34; H04N 5/772; H04N 9/8211; G09G 5/02; G09G 2320/2671
See application file for complete search history.

(56) References Cited

U.S. PATENT DOCUMENTS

| | | | |
|---|---|---|---|
| 2015/0155008 A1* | 6/2015 | Herberger | G11B 27/034 386/224 |
| 2021/0357555 A1* | 11/2021 | Liu | G06F 30/27 |
| 2022/0323736 A1* | 10/2022 | Azdoud | A61B 5/442 |
| 2022/0335630 A1* | 10/2022 | Lang | A61F 2/4684 |
| 2022/0368742 A1* | 11/2022 | Chang | G06F 3/0488 |
| 2024/0346621 A1* | 10/2024 | Agrawal | G06T 5/20 |

* cited by examiner

Primary Examiner — Wesner Sajous
(74) Attorney, Agent, or Firm — FIG. 1 Patents

(57) ABSTRACT

Real time pattern preview generation and capture techniques are described. In an example, a live stream of digital images is displayed in a user interface by a computing device. A real time preview of visual patterns in the user interface is then generated and displayed based on the digital images. The visual patterns, for instance, are generated by the computing device in real time using a combination of shape extraction and pattern generation. An option is also made available to convert the real time preview into a vector image, such as a vector pattern tile.

20 Claims, 13 Drawing Sheets

1000

```
float2 textureIndex00(gid.x - 1, gid.y - 1);
float3 color00 = inTexture.sample(linearRepeatSampler, textureIndex00).rgb;

float2 textureIndex01(gid.x, gid.y - 1);
float3 color01 = inTexture.sample(linearRepeatSampler, textureIndex01).rgb;

float2 textureIndex02(gid.x + 1, gid.y - 1);
float3 color02 = inTexture.sample(linearRepeatSampler, textureIndex02).rgb;

float2 textureIndex10(gid.x - 1, gid.y);
float3 color10 = inTexture.sample(linearRepeatSampler, textureIndex10).rgb;

float2 textureIndex12(gid.x + 1, gid.y);
float3 color12 = inTexture.sample(linearRepeatSampler, textureIndex12).rgb;

float2 textureIndex20(gid.x - 1, gid.y + 1);
float3 color20 = inTexture.sample(linearRepeatSampler, textureIndex20).rgb;

float2 textureIndex21(gid.x, gid.y + 1);
float3 color21 = inTexture.sample(linearRepeatSampler, textureIndex21).rgb;

float2 textureIndex22(gid.x + 1, gid.y + 1);
float3 color22 = inTexture.sample(linearRepeatSampler, textureIndex22).rgb;

float3 u = (-1.0 * color00 +
            -2.0 * color10 +
            -1.0 * color20 +
             1.0 * color02 +
             2.0 * color12 +
             1.0 * color22
            ) / 4.0;

float3 v = (-1.0 * color00 +
            -2.0 * color01 +
            -1.0 * color02 +
             1.0 * color20 +
             2.0 * color21 +
             1.0 * color22
            ) / 4.0;

float3 s(
            dot(u, u),   // guaranteed to be positive
            dot(v, v),   // guaranteed to be positive
            dot(u, v)    // may be negative
         );
s = 10000.0 * s;
```

```
let cUnitSizeFactor = Float(2.0)
let cGaussBlurSigma = PatternFilterConstants.kGaussianBlurCoherenceValue;// 4.0
let megaPixels = (Float) (sizeOfFrame.width * sizeOfFrame.height) / 1000000.0
let sizeAdjustment = (megaPixels / cUnitSizeFactor).squareRoot()
let gaussSigma = cGaussBlurSigma * sizeAdjustment
```

```
func computeRadius (sigma: Float) -> Int {
    let r = max(1.0, 2.0 * sigma)
    if(r >= Float(maxExpos)){
        //error
    }
    return Int(min(Float(maxExpos-1), floor(r)))
} func computeExponents (sigma: Float) -> (radius: Int, exponents: [Float]) {
    var expos = [Float](repeating: 0.0, count: maxExpos
    let radius = computeRadius(sigma: sigma)
    let fac = -1.0 / (2.0 * sigma * sigma)
    var sum: Float = 1.0
    expos[0] = sum
    for r in 1...(radius-1) {
        let v = exp(Float(r*r)*fac)
        expos[r] = v
        sum += 2.0 * v
    }
    for r in 0...(radius-1) {
        expos[r] /= sum
    }
    return (radius, expos)
}
```

Fig. 12

```
kernel void
transformKernel(texture2d<float, access::read>   inTexture  [[texture(TextureIndexInput)]],
                texture2d<float, access::write>  outTexture [[texture(TextureIndexOutput)]],
                constant TextureTransform* transform [[buffer(BufferIndexUniform)]],
                uint2                     gid        [[thread_position_in_grid]]) { uint2 srcLoc;
    srcLoc.x = gid.x * transform -> transform[0] + transform -> transform[2];
    srcLoc.y = gid.y * transform -> transform[1] + transform -> transform[3];
    float4 inColor = inTexture.read(srcLoc);
    outTexture.write(inColor, gid);
}
```

Fig. 13

REAL TIME PATTERN PREVIEW GENERATION

BACKGROUND

Visual patterns are incorporated in a wide variety of content. Physical examples include use on physical objects "in the real world" such as carpet, wallpaper, floor tiles, clothing, and so forth. Digital examples include use by a computing device and online examples such as webpages, album art, video games, application user interfaces, and so forth.

Likewise, artist inspiration in the creation of visual patterns may also originate from an equally diverse range of sources, from digital images viewed online to physical objects in the real world. However, conventional techniques implemented by a computing device to assist in creation of visual patterns are modal and rely on a manual sequence of steps to implement, which causes user frustration and inefficient use of computational resources.

SUMMARY

Real time vector pattern generation and display techniques are described. In an example, a live stream of digital images is displayed in a user interface by a computing device. The digital images, for instance, are captured of a physical object in a physical environment using an image capture device of the computing device. An input is received via the user interface to initiate generation of a visual pattern, e.g., through selection of an option displayed in the user interface, in response to a spoken utterance, gesture, and so forth.

In response, a real time preview of visual patterns in the user interface is displayed. The visual patterns are generated from the digital images in the live stream, e.g., from respective digital images. The visual patterns, for instance, are generated by the computing device in real time using a combination of shape extraction and pattern generation. The real time preview supports an ability to change how a depiction of the physical object is captured by an image capture device and used to generate the visual pattern. An option is made available in an example to convert the real time preview into a vector image, thereby also increasing visual accuracy made available by these techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 10 depicts an example of operations performed by an edge detection filter module of FIG. 4 in generating gradients.

FIGS. 11 and 12 depict example implementations of calculations performed by a smoothing module of FIG. 4 in a pipeline implementation.

FIG. 13 depicts example operations usable by a pattern crop filter of FIG. 6 in generating the pattern cell.

DETAILED DESCRIPTION

Overview

Figure 1:
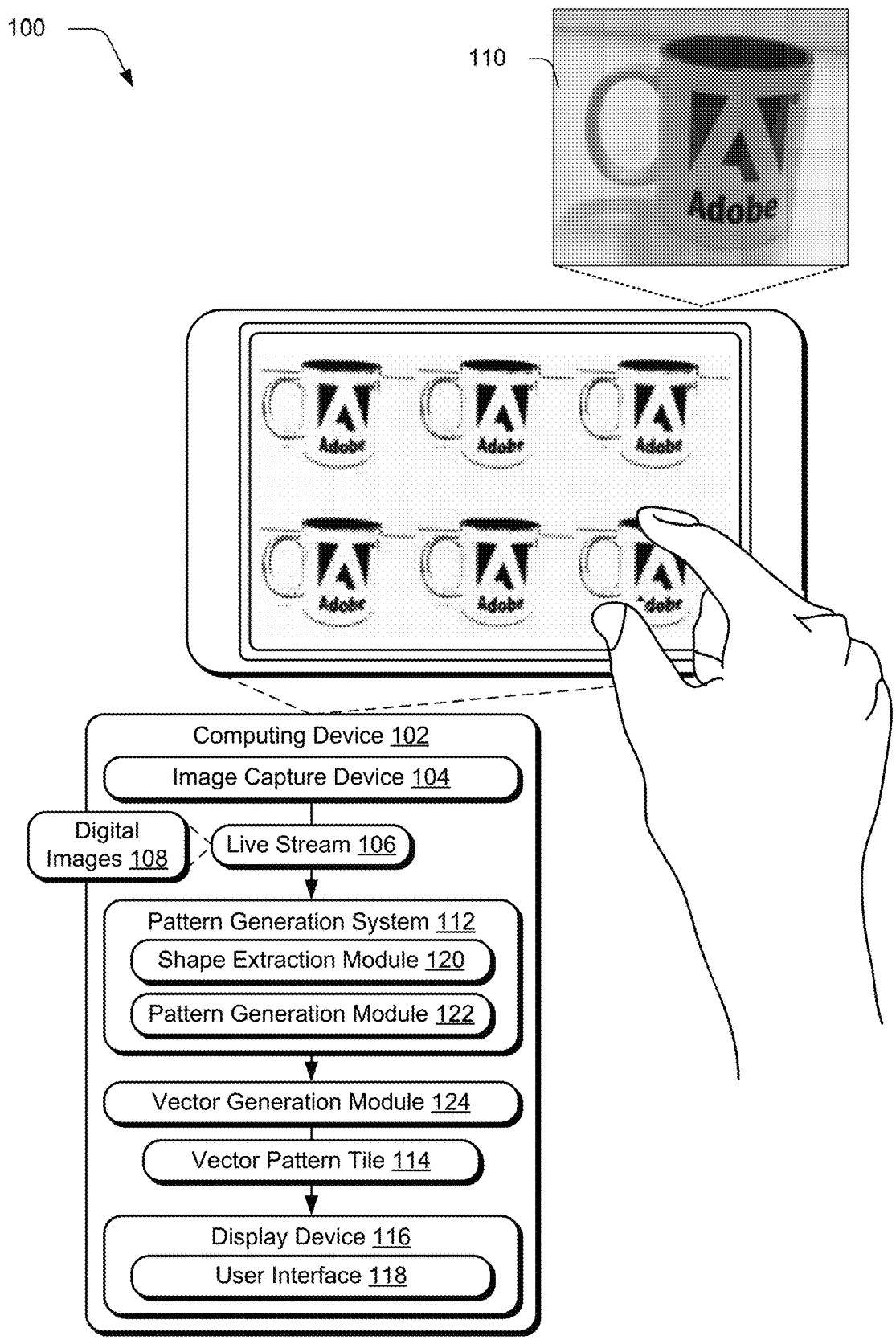
FIG. 1 is an illustration of an environment in an example implementation that is operable to employ real time pattern preview and display techniques described herein.

Visual patterns are used in a variety of physical and digital scenarios. Conventional visual pattern creation techniques as implemented by computing devices, however, are modal and involve a series of manual steps which consume a significant amount of time, often rely on detailed user knowledge, and result in inefficient consumption of computing resources.

To address these technical challenges, real time pattern preview generation and display techniques are described. In an example, these techniques support real time output of a preview depicting an appearance of a visual pattern as generated based on a physical object as captured in a live stream of digital images. In this way, changes may be made in real time in how the visual pattern appears due to changes in how the physical object is captured in the digital images, such as to change lighting, angle, distance and so forth. As a result, the techniques described herein overcome challenges of conventional modal and manual techniques through real time output, which is not possible in conventional techniques. These techniques are also applicable for processing other digital images that are not obtained from a live stream with increased efficiency, such as through use of a digital image obtained online, from a digital movie, as a single digital image, and so forth.

A pattern generation implemented by a computing device, for instance, receives a live stream of digital images from an image capture device, which are displayed in a user interface. The pattern generation system then employs shape extraction techniques and pattern generation techniques to generate a pattern cell from an object depicted in the digital image, which is then used as a basis to generate a visual pattern. The pattern generation system, for instance, generates the visual pattern based on a number of repetitions of the pattern cell specified by a pattern input received via the user interface, e.g., to generate a square pattern, a six-fold pattern, and so on.

In order to generate the visual pattern, the pattern generation module takes as an input a digital image, e.g., a raster image (bitmap) from the image capture device as part of a live stream, from a digital source, and so forth. The pattern generation module then generates luminance values by converting color values from the digital image. Edge detection data is generated having gradients based on the luminance values, e.g., through use of a Sobel filter for both vertical and horizontal directions. Smoothing may be performed by the pattern generation to smooth the gradients, such as through use of a Gaussian blur filter used also in both vertical and horizontal directions to reduce image noise encountered in the edge detection data.

The pattern generation module determines a direction and magnitude of the gradients, an example of which utilizes a Tensor magnitude filter. The Tensor magnitude filter, for instance, generates a magnitude that is normalized between "[0,1]" and a ratio of a magnitude is retained along with various directions, instead of absolute values. Shapes are then extracted through use of an extended different of Gaussian pass filter (e.g., XDog pass filter) that outputs a continues set of probabilities of edges for thresholding. The probabilities, for instance, are usable to define a likelihood of respective pixels as included as part of an edge and are therefore usable to extract the shape of the object from the digital image. In an implementation, a smoothing filter (e.g., dilation filter) is utilized to reduce noise and aliasing artifacts.

The extracted shape is then used as a basis by the pattern generation module to generate a pattern cell, which is a repeatable unit that is to be used to generate the visual pattern. A pattern input, for instance, is received by the pattern generation module that specifies a type of pattern to be generated, e.g., square, four-fold pattern, six-fold pattern, etc. The pattern generation module then uses the pattern cell as a basis to generate a number of repetitions of the pattern cell specified by the pattern input. The visual pattern is then output in real time in the user interface as a real time preview. As a result, the user interface provides real time feedback regarding an effect of changes made to digital images as captured by an image capture device on pattern generation, which is not possible in conventional techniques.

The pattern generation also supports generation of a vector pattern tile from the pattern cell. The vector pattern tile, for instance is rendered on a specific-sized canvas which is then vectorized, e.g., mathematically defined using Bezier curves. In this way, the vector pattern tile also supports increased functionality including an ability to resize, increased resolution and accuracy, and so forth which is not possible in conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ visual pattern and real time preview techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 14.

The computing device 102 includes an image capture device 104 that is configured to capture a live stream 106 of digital images 108. The image capture device 104, for instance, is configurable as a charge-coupled device to capture light from a physical environment that includes a physical object 110. The digital images 108 are then formed (e.g., as raster images such as bitmaps) to depict the physical object 110 based on signals output by the image capture device 104, e.g., as a JPEG, PNG, or other digital image format.

A pattern generation system 112 then receives the digital images 108 in the live stream 106 sequentially from the image capture device 104. Other examples are also contemplated, such as to obtain the digital images 108 online from a webpage, stock digital image service provider, social media network, from a local storage device, and so forth. The pattern generation system 112 is configured in this example to generate a vector pattern tile 114 which is then output to a display device 116 for display in a display device 116. In the illustrated example, the pattern generation system 112 also supports a real time preview in the user interface 118 as the digital images 108 are received via the live stream 106, which is not possible in conventional techniques.

As part of supporting the real time preview, the pattern generation system 112 includes a shape extraction module 120 and a pattern generation module 122. The shape extraction module 120 is configured to extract a shape from the digital images 108, e.g., that depicts the physical object 110. The pattern generation module 122 is then employed to generate a pattern cell that represents a repeatable visual unit that is to be used to generate a visual pattern, which may be output as part of the real time preview. A vector generation module 124 is then implemented to generate the vector pattern tile 114 as a vector object from the pattern cell output by the pattern generation system 112. In this way, the pattern generation system 112 supports real time output and increased visual accuracy in comparison with conventional pattern generation techniques.

With the real time preview, a creative is provided functionality by the pattern generation system 112 of a real time preview of a visual pattern for a given live stream 106 of digital images 108. In this way, the creative is able to experiment with camera angle, settings, and amount of content and so on and receive feedback in real time as to an effect of these changes, which is not possible in conventional techniques. Once a desired output is achieved, the pattern generation system 112 supports an ability to generate a vector pattern tile 114 by the vector generation module 124 based on the preview. Through use of the shape extraction module 120 and pattern generation module 122 in this example, live frame rates (e.g., of at least twenty-five to thirty frames per second) are processed to support the real time preview. In this way, the pattern generation system 112 supports an ability to change a threshold to control an amount of content used from the frame by adjusting "what" is captured in each of the digital images 108, has increased visual accuracy in catching minute details over conventional techniques, and may preserve these details through use of the vector generation module 124. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Real Time Preview

Figure 2:
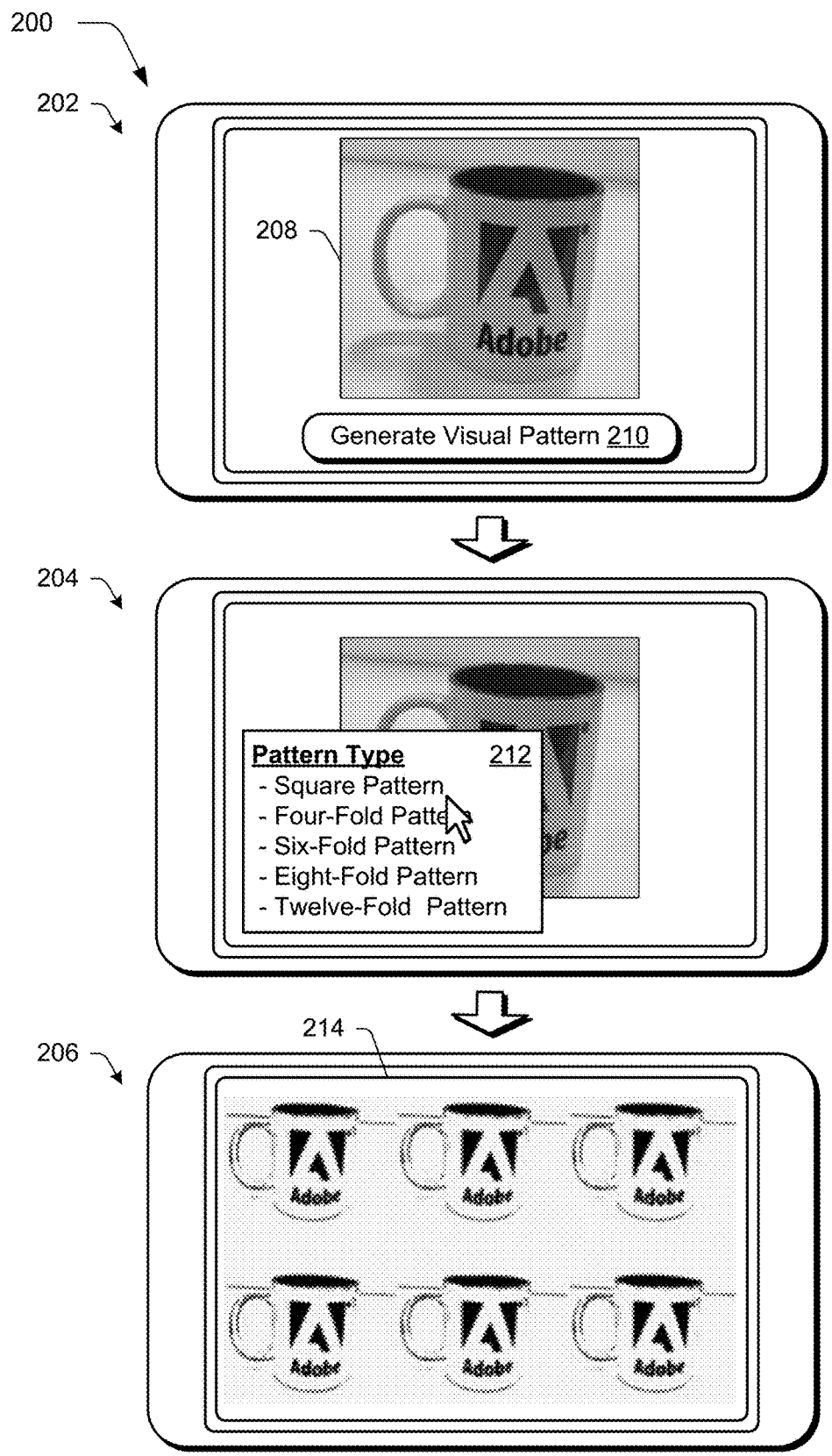
FIG. 2 depicts a system in an example implementation showing operation of the pattern generation system as provide a real time preview of a visual pattern.
Figure 3:
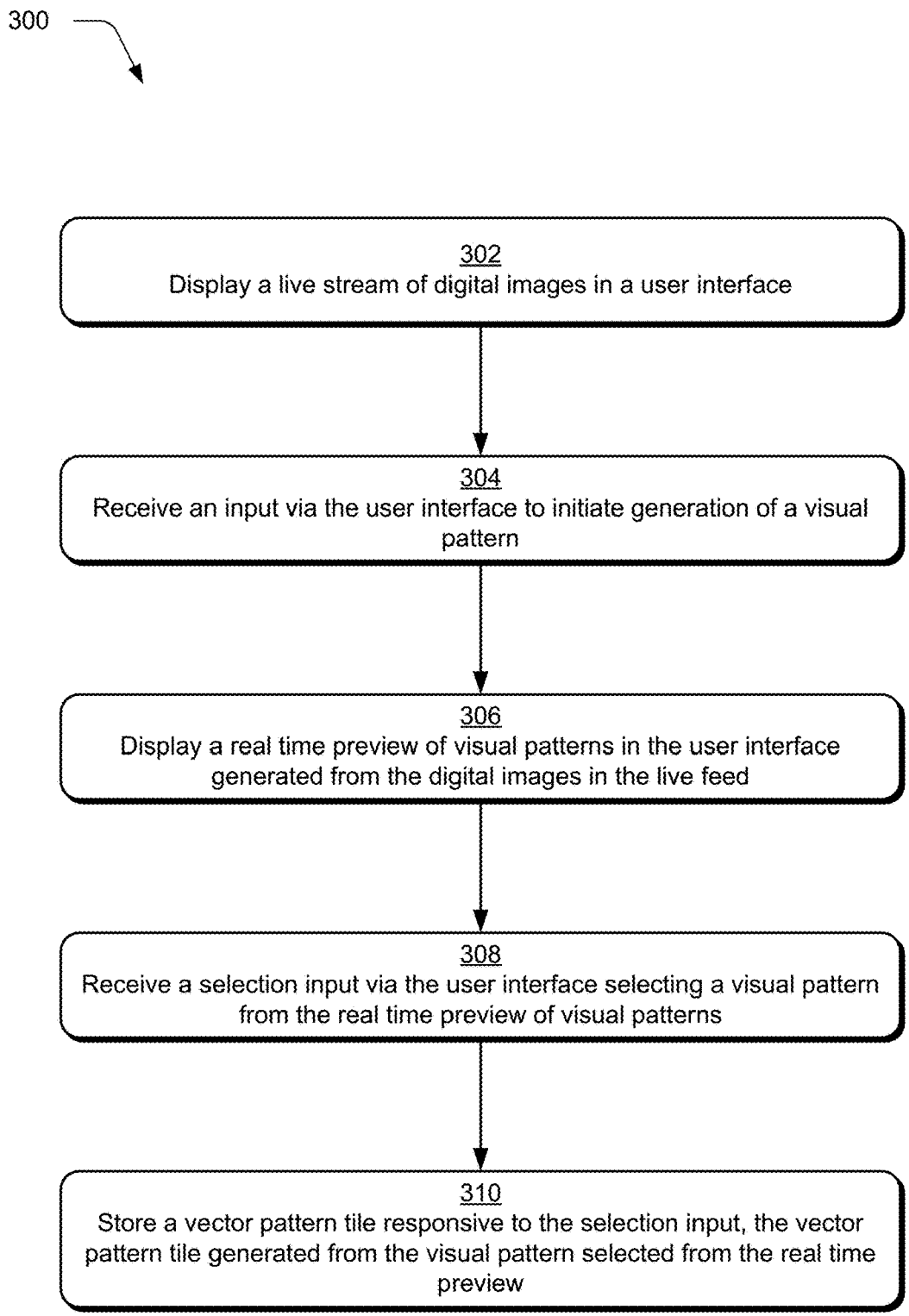
FIG. 3 is a flow diagram depicting a step-by-step procedure in an example implementation of operations performable by a processing device for accomplishing a result of displaying a real time preview of a visual pattern generated from digital images captured in a live stream.

FIG. 2 depicts a system 200 in an example implementation showing operation of the pattern generation system 112 of FIG. 1 as providing a real time preview of a visual pattern. This system 200 is illustrated through the use of a first stage 202, second stage 204, and third stage 206. In the discussion of FIG. 2, reference is also made in parallel to FIG. 3. FIG. 3 is a flow diagram depicting a step-by-step procedure 300 in an example implementation of operations performable by a processing device for accomplishing a result of displaying a real time preview of a visual pattern generated from digital images captured in a live stream.

The following discussion describes real time preview techniques that are implementable utilizing the described systems and devices. Aspects of the procedure is implemented in hardware, firmware, software, or a combination thereof. The procedure is shown as a set of blocks that specify operations performable by hardware and are not necessarily limited to the orders shown for performing the operations by the respective blocks. Blocks of the procedure, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

To begin at the first stage 202, a live stream 106 of digital images 108 is displayed in a user interface (block 302). The live stream 106, for instance, is captured by an image capture device 104 of the computing device 102. In another example, the live stream 106 is streamed via a network, e.g., from a service provider system, as a movie, and so forth. Non-streaming examples are also contemplated. An example of a digital image 208 received via the live stream 106 is displayed in a user interface.

The user interface includes an option 210 to generate a visual pattern. Accordingly, an input is received in this example that selects the option 210 (e.g., via a cursor control device, spoken utterance, gesture, and so forth) to initiate generation of a visual pattern (block 304).

In response, as shown at a second stage 204, the user interface outputs functionality usable to provide a pattern input to select a type of visual pattern to be generated. In the illustrated example, this functionality is implemented using a menu 212 as a "pop-up" having options that are usable to select the different types of patterns, such as a square pattern, four-fold pattern, six-fold pattern, eight-fold pattern, twelve-fold pattern, and so forth. The "fold" patterns are examples of kaleidoscopic patterns having repeating portions that overlap and are "folded" using respective numbers of instances.

The pattern generation system 112 at the third stage 206 then generates a real time preview 214 of visual patterns in the user interface generated from the digital images in the live stream (block 306). In the illustrated example, a square pattern has been selected and in response an instance of the shape extracted from the digital image 208 is repeated six times to generate the visual pattern. In this way, the real time preview 214 supports feedback with increased efficiency in generating the visual pattern.

Once a desirable visual pattern is achieved as depicted in the real time preview 214, the pattern generation system 112 receives a selection input via the user interface selecting a visual pattern from the real time preview of visual patterns (block 308). A "tap," for instance, is received via the user interface to select a visual pattern from a particular frame as output in the real time preview 214 based on a corresponding digital image 108.

In response, the pattern generation system 112 generates and stores a vector pattern tile 114 responsive to the selection input (block 310). In order to generate the real time preview 214 and vector pattern tile 114, shape extraction and pattern generation are utilized by the shape extraction module 120 and pattern generation module 122, respectively. An output of which is then usable as a basis to generate the vector pattern tile 114 by the vector generation module 124. Further discussion of this and other examples is included in the following section and shown in corresponding figures.

Shape Extraction and Pattern Generation

Figure 4:
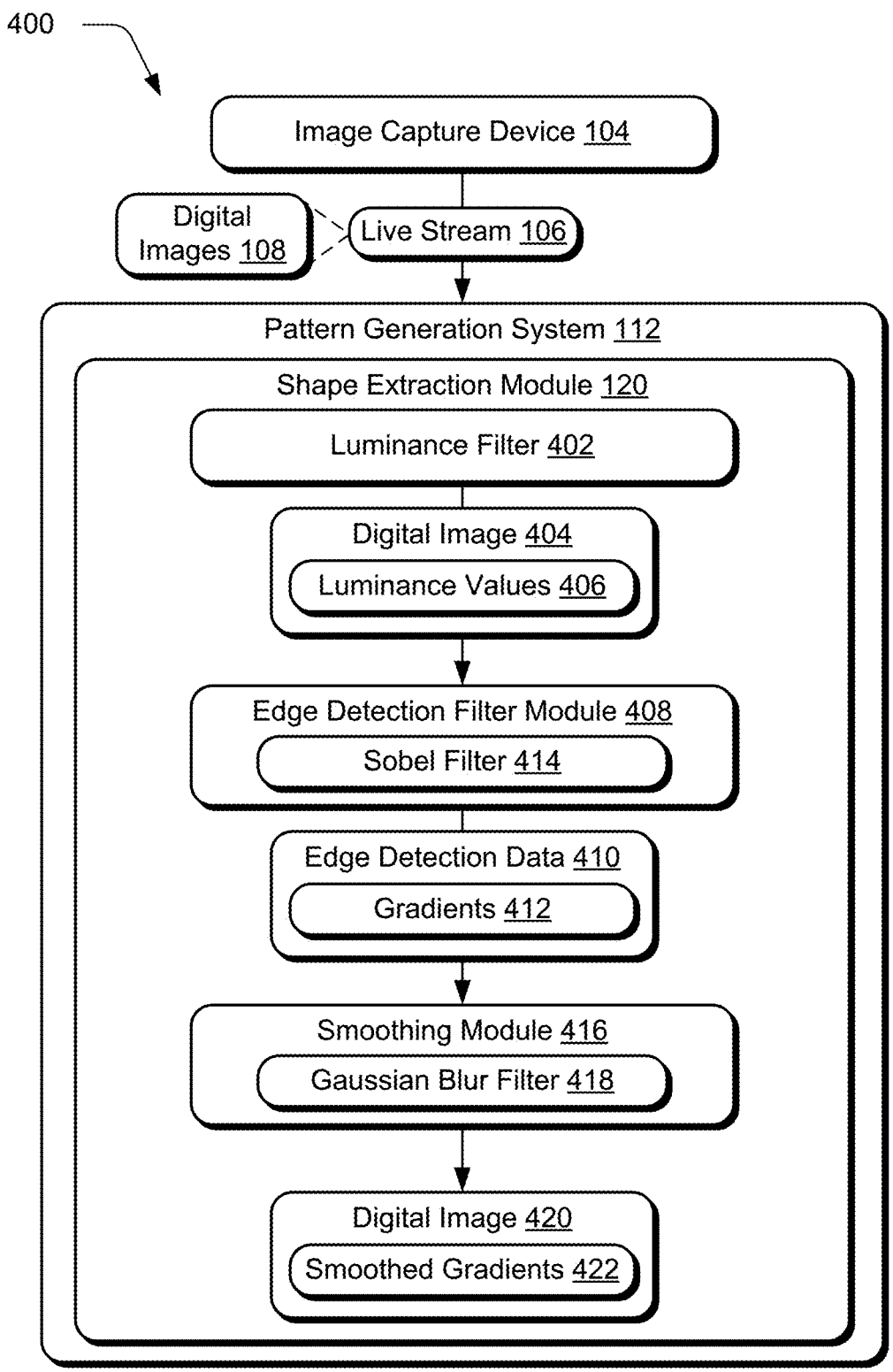
FIG. 4 depicts a system in an example implementation showing operation of a shape extraction module of FIG. 1 in greater detail.
Figure 5:
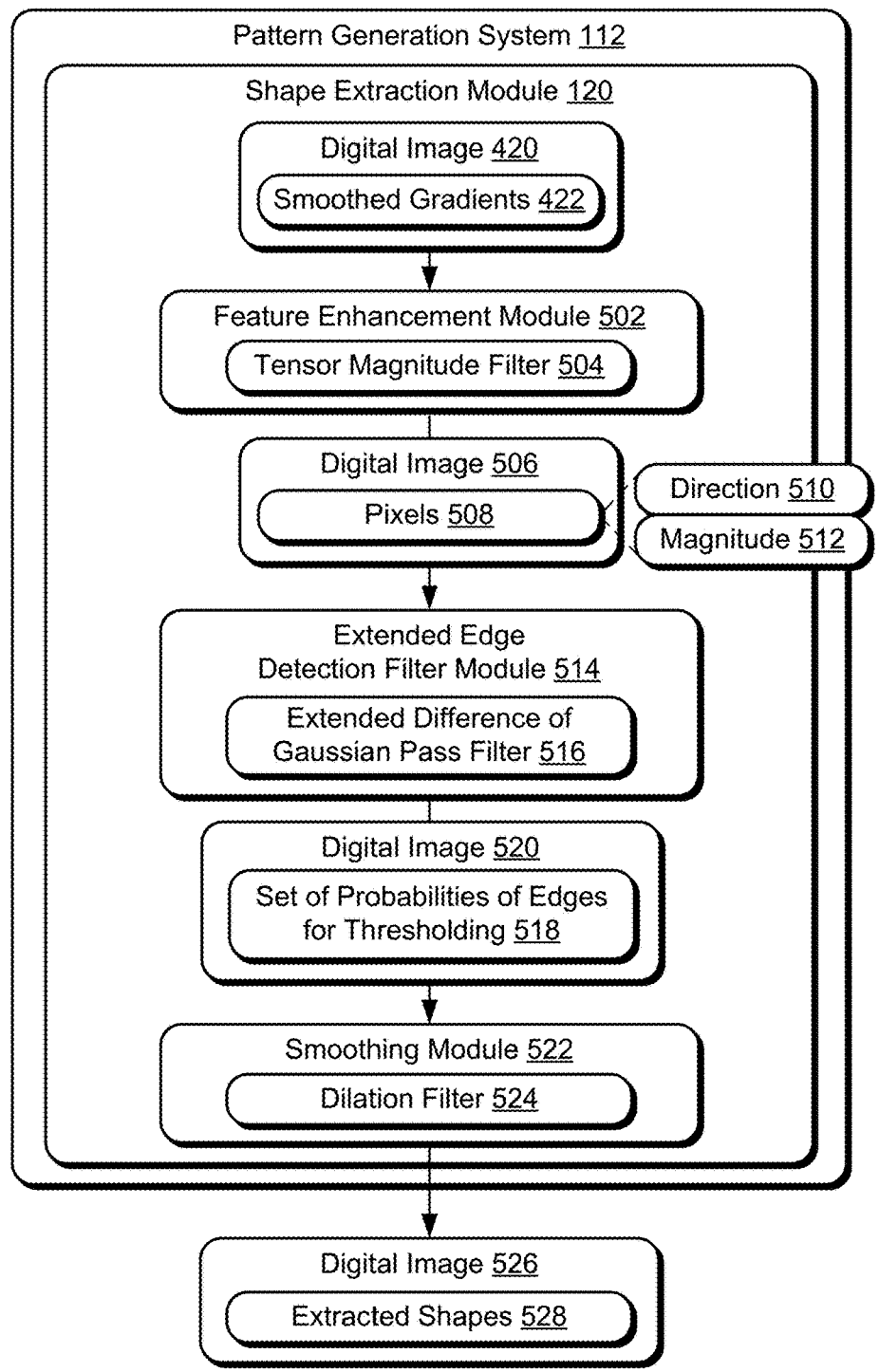
FIG. 5 depicts a system in an example implementation showing continued operation of the shape extraction module of FIG. 4 in greater detail as generating an extracted shape.
Figure 6:
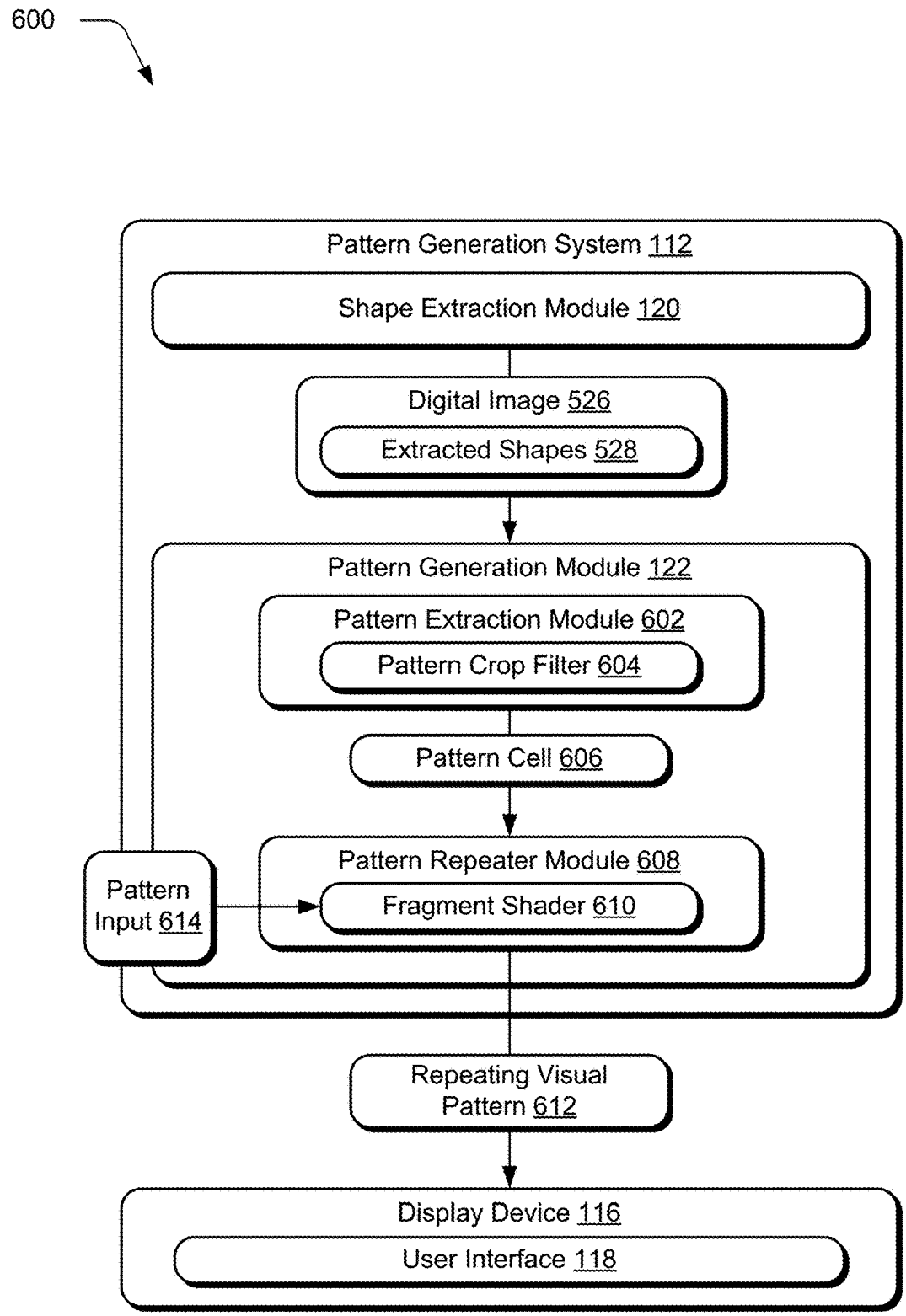
FIG. 6 depicts a system in an example implementation showing operation of a pattern generation module of FIG. 1 in greater detail.
Figure 7:
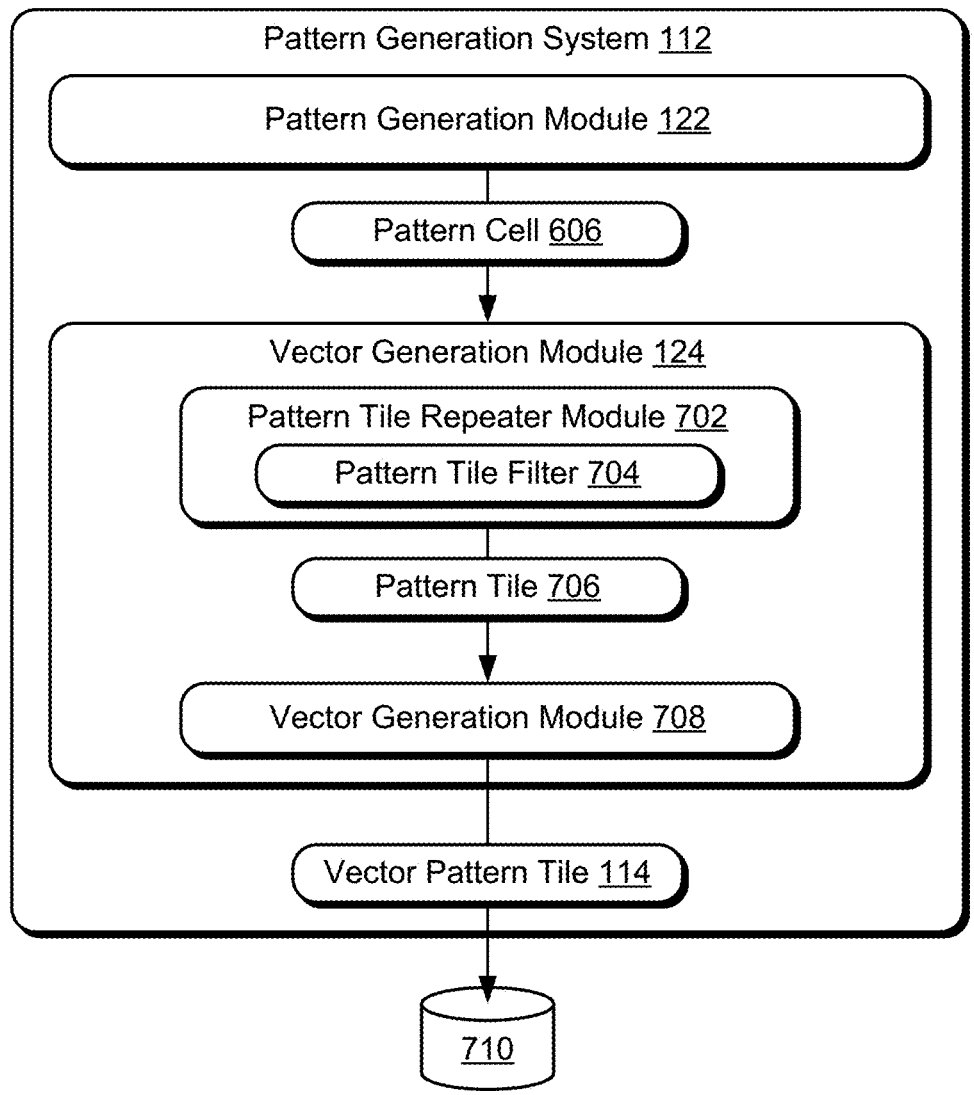
FIG. 7 depicts a system in an example implementation showing operation of a vector generation module of FIG. 1 in greater detail.
Figure 8:
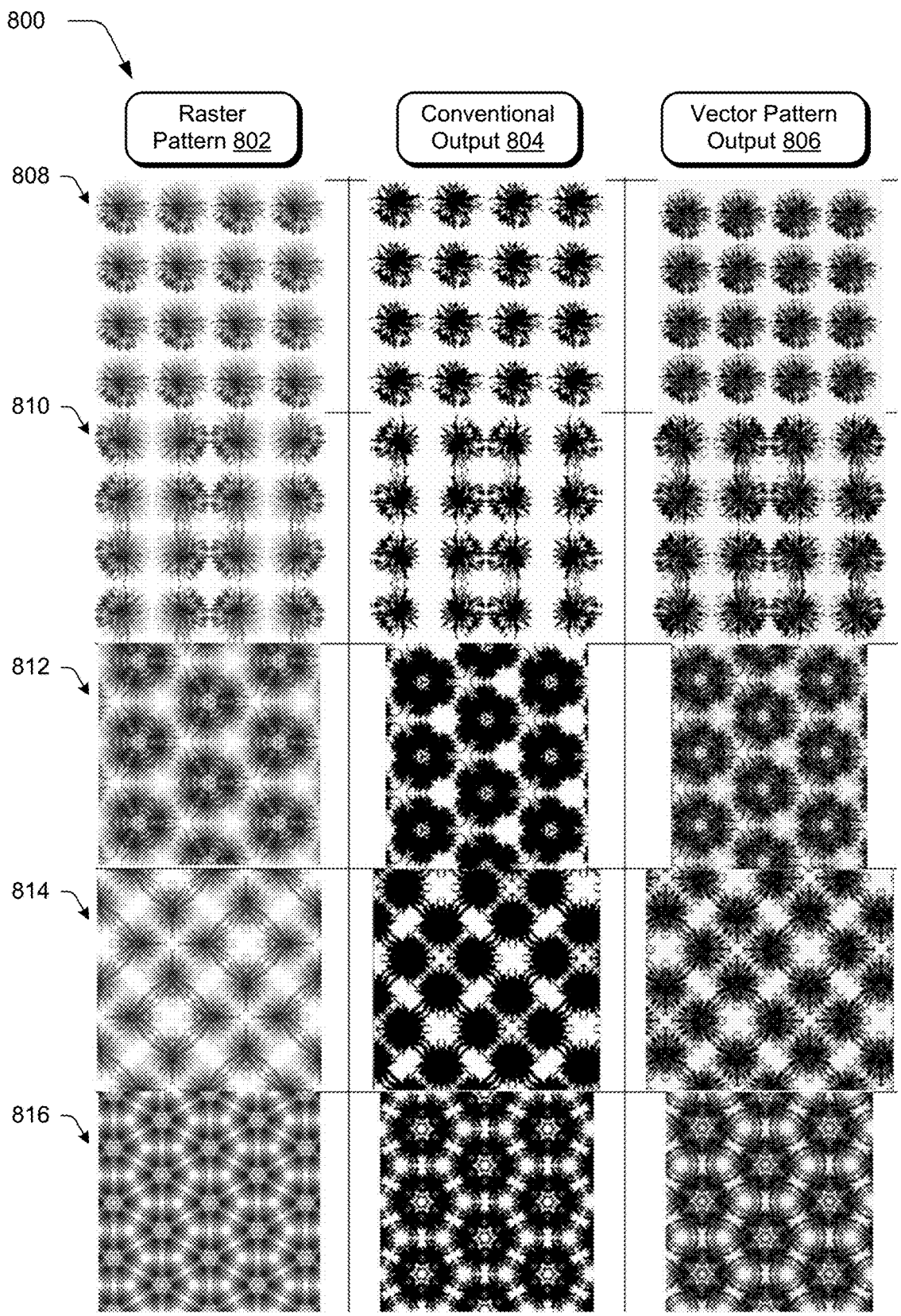
FIG. 8 depicts examples of visual patterns corresponding to a raster pattern, a conventional output, and a vector pattern tile output for different types of repeating visual patterns.
Figure 9:
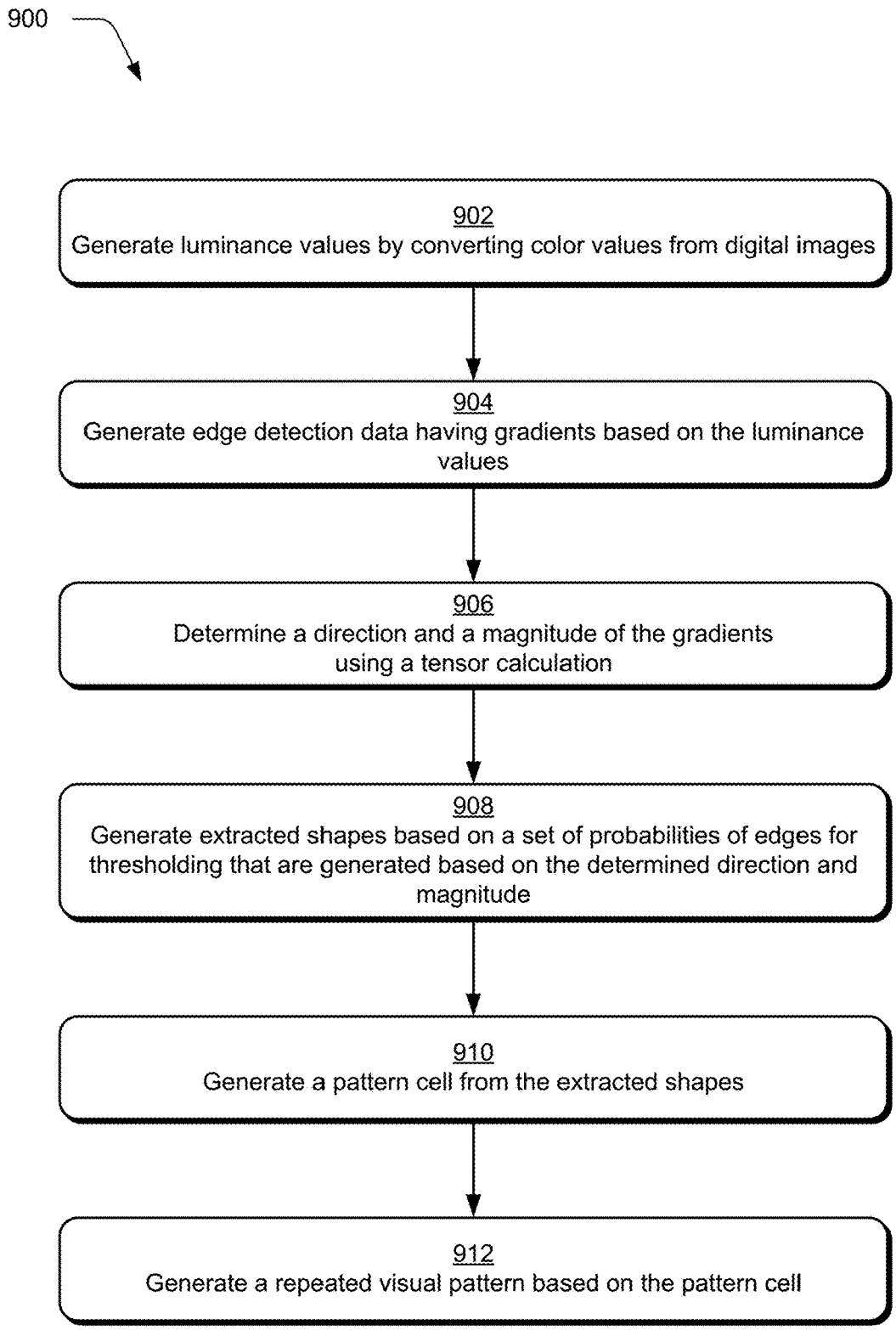
FIG. 9 is a flow diagram depicting a step-by-step procedure in an example implementation of operations performable by a processing device for accomplishing a result of generating a repeated visual pattern.

FIG. 4 depicts a system 400 in an example implementation showing operation of a shape extraction module of FIG. 1 in greater detail. FIG. 5 depicts a system 500 in an example implementation showing continued operation of the shape extraction module of FIG. 4 in greater detail as generating an extracted shape. FIG. 6 depicts a system 600 in an example implementation showing operation of a pattern generation module of FIG. 1 in greater detail. FIG. 7 depicts a system 700 in an example implementation showing operation of a vector generation module of FIG. 1 in greater detail. FIG. 8 depicts examples 800 of visual patterns corresponding to a raster input, a conventional output, and a vector pattern tile output for different types of repeating visual patterns. FIG. 9 is a flow diagram depicting a step-by-step procedure 900 in an example implementation of operations performable by a processing device for accomplishing a result of generating a repeated visual pattern.

The following discussion describes real time preview techniques that are implementable utilizing the described systems and devices. Aspects of the procedure is implemented in hardware, firmware, software, or a combination thereof. The procedure is shown as a set of blocks that specify operations performable by hardware and are not necessarily limited to the orders shown for performing the operations by the respective blocks. Blocks of the procedure, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform algorithm.

In these examples, a shape extraction algorithm is utilized by the pattern generation system 112 to simplify an input digital image 108, which is then used as a basis for pattern generation. These techniques operate with improved efficiency, thereby supporting real time output of a real time preview as described in the previous section, which is not possible using conventional techniques.

As illustrated in an example system 200 of FIG. 2, for instance, a shape extraction module 120 of the pattern generation system 112 receives digital images 108 via a live stream 106 from an image capture device 104. Other examples are also contemplated, including reception of the live stream 106 from an online source (e.g., social media service), examples that are based on a single digital image 108, and so forth.

As illustrated in FIG. 4, a luminance filter 402 is first employed by the shape extraction module 120 in this example to generate a digital image 404 of luminance values 406 by converting color values from digital images (block 902). The luminance filter 402, for instance, converts each RGB value of pixels of the digital image 108 to a single luminance value. This conversion is performable, for instance, as a dot product between normalized RGB values to a vector (e.g., "float3" vector) with corresponding values, e.g., "0.21," "0.71," and "0.08."

The luminance values 406 are then provided as an input to an edge detection filter module 408. The edge detection filter module 408 is configured to generate edge detection data 410 having gradients 412 based on the luminance values 406 (block 904). The edge detection filter module 408, for instance, employs a Sobel filter 414 to detect edges based on the luminance values 406. The Sobel filter 414 uses convolution kernels to compute a weighted sum of pixel values in a neighborhood of each pixel to detect edges in horizontal and vertical directions.

In one or more implementations, horizontal and vertical gradients are not clamped, finally, to extract edges, but these gradients are leveraged for additional calculations and increase accuracy in finer decision making for generating appealing edges as part of an extracted shape. To optimize the resulting gradients 412, a factor (e.g., values of 10 k) is multiplied by the edge detection filter module 408 to the gradient magnitudes to avoid issues arising with low precision blurring. FIG. 10 depicts an example 1000 of operations performed by the edge detection filter module 408 in generating the gradients 412. A variety of other edge detection techniques may also be utilized.

The gradients 412 of the edge detection data 410 are then passed from the edge detection filter module 408 as an input in the illustrated example of FIG. 4 to a smoothing module 416. The smoothing module 416, for instance, is configured to leverage a Gaussian blur filter 418 to generate a digital image 420 of smoothed gradients 422.

The Gaussian blur filter 418, for instance, is utilized to reduce noise and reduce detail. The Gaussian blur filter 418 is applied in both vertical and horizontal directions to convolve the image using a Gaussian function. In order to achieve "smoother" results in an implementation, the Gaussian blur filter 418 utilizes calculated a threshold value that is used to multiply intensity of neighboring pixels in real time, i.e., "on the fly." This calculation is configured to address an overall number of pixels that are a subject of the operation (e.g., an overall size of the digital image 108).

FIGS. 11 and 12 depict example implementations 1100, 1200 of calculations performed by the smoothing module 416 in a pipeline implementation. Using a "gaussSigma" as calculated by the smoothing module 416, a radius (e.g., a number of neighbors to be used for Gaussian calculation of a pixel) and exponents (e.g., a threshold value multiplied by an intensity of a neighboring pixel) are calculated. This calculation is performable responsive to detected changes in a size of an input digital image 108, otherwise the same numbers are used in support of increased efficiency to achieve real time output.

FIG. 5 depicts a system 500 in an example implementation showing continued operation of the shape extraction module of FIG. 4 in greater detail as generating an extracted shape. A feature enhancement module 502 receives the digital image 420 having the smoothed gradients 422. The feature enhancement module 502 is then utilized to determine a direction and a magnitude of the gradients using a tensor calculation (block 906) by a tensor magnitude filter 504. Accordingly, an output having a direction 510 and magnitude 512 defined, respectively, for each of the pixels 508 in a digital image 506.

The tensor magnitude filter 504, for instance, is configured to perform a structure tensor calculation that generates an output for each pixel that includes a direction of a gradient in a specified neighborhood and a magnitude of the gradient along a corresponding axis. The direction is definable using negative or positive values and the magnitude is a real number in an example implementation.

As part of supporting output of the real time preview, the tensor magnitude filter 504 is modifiable to normalize a magnitude 512 to "[0,1]" instead of providing raw magnitude and directions. A ratio of the magnitude 512 along the various directions is then retained in place of the absolute values. In addition, the direction 510 is splitable into negative and positive values that are separately stored to avoid truncation issues.

An extended edge detection filter module 514 is then utilized to detect edges using an edge detection filter. In the illustrated example, the edge detection filter is implemented using an extended difference of Gaussian pass filter 516, i.e., XDog. An output of the extended different of Gaussian pass filter 516 is a set of probabilities of edges for thresholding 518 with respect to the digital image 520. "Thresholding" is utilized with respect to the properties to define "what is" and "what is not" an edge based on a respective threshold. In an implementation, instead of using a set threshold value to be multiplied using an intensity of neighboring pixels, threshold values are calculated upon a basis of an overall size of the digital image 108, similar to the Gaussian blur calculations described above.

A smoothing module 522 then employs a smoothing filter (e.g., a dilation filter 524) to the output of the extended edge detection filter module 514, i.e., the set of probabilities for thresholding 518. An output of the extended edge detection filter module 514, for instance, may include noise that causes flicker that is viewable between output of successive frames of a real time preview. Conventional thresholding techniques, for instance, typically result in rough edges and aliasing artifacts.

To address this technical challenge, a dilation filter 524 is used for smoothing without a loss of curvature at the edges. In a conventional dilation filter, a pixel is shaded based on whether any other pixel in a neighborhood of the pixel is shaded. The dilation filter 524 described herein, however, shades a pixel based on an average shade of the pixels included in a neighbor of the pixel. The shading intensity of the neighboring pixels, in an implementation, is multiplied by a threshold calculated based on a size of the digital image 108. As a result, extracted shapes 528 are thus generated based on a set of probabilities of edges for thresholding that are generated based on the determined direction and magnitude (block 908). The extracted shapes 528 are then used as a basis to generate a pattern cell, an example of which is described as follows.

FIG. 6 depicts a system 600 in an example implementation showing operation of a pattern generation module 122 of FIG. 1 in greater detail. The extracted shapes 528 of the digital image 526 are then passed from the shape extraction module 120 as an input to the pattern generation module 122. The pattern extraction module 602 employs a pattern crop filter 604 to generate a pattern cell 606 (block 910).

The pattern crop filter 604, for instance, is utilized to extract the pattern cell 606 as a subsection of the digital image 526, e.g., as a square subsection. FIG. 13 depicts an example 1300 operations usable by the pattern crop filter 604 in generating the pattern cell 606. The pattern crop filter 604 is implemented as a compute/kernel graphics processing unit (GPU) shader as implementing logic including scaling and translation to process the extracted shapes 528 to generate the pattern cell 606.

The pattern cell 606 is the illustrated example of FIG. 6 is then received as an input by a pattern repeater module 608. The pattern repeater module 608 is implemented as a fragment shader 610 (e.g., as a graphics processing unit shader) as a "pass through" filter to generate a repeating visual pattern 612 based on the pattern cell 606 (block 912). The pattern repeater module 608, for instance, receives a pattern input 614 describing a type of repeating pattern to be generated as shown in FIG. 2. Examples include a square pattern, "fold" patterns used to provide a kaleidoscopic effect, and so forth. The repeating visual pattern is then output in a user interface 118 of the display device 116 as part of a real time preview. The real time preview may then be used as a basis to generate a vector patter tile 114 by generating a vector digital image of the pattern tile 706 used to form the real time preview as further described below.

FIG. 7 depicts a system 700 in an example implementation showing operation of a vector generation module of FIG. 1 in greater detail as generating a vector pattern tile 114. To do so, a pattern tile repeater module 702 utilizes a pattern tile filter 704 to generate a pattern tile 706. The pattern tile 706 is used to render the pattern cell 606 to a canvas having a particular size, e.g., having a predefined resolution and dimensions in horizontal and vertical directions.

The vector generation module 708 is then used to generate the vector pattern tile 114 using a variety of vectorization techniques. Example of vectorization techniques includes vectorization algorithms that are configured to analyze the pattern cell and convert it into a vector format, e.g., using Bezier curves. The vector pattern tile 114 is then stored to a storage device 710 in this example for future usage, e.g., as a basis to generate a variety of different types of visual patterns. A variety of other examples are also contemplated.

FIG. 8 depicts examples 800 of visual patterns corresponding to a raster input 802, a conventional output 804, and a vector pattern tile output 806 for different types of repeating visual patterns. The raster patterns 802 are generated from a given raster input image of a flower. The conventional output 804 depicts conventional pattern generation techniques as contrasted with example of vector pattern outputs 806 generated using the techniques described herein. As illustrated, the vector pattern outputs 806 provide increased accuracy and richness in appearance when compared with the conventional output 804. Example pattern types include a square pattern 808 and kaleidoscopic patterns includes a four-fold pattern 810 six-fold pattern 812, eight-fold pattern 814, and twelve-fold pattern 816. A variety of other examples are also contemplated.

Example System and Device

Figure 14:
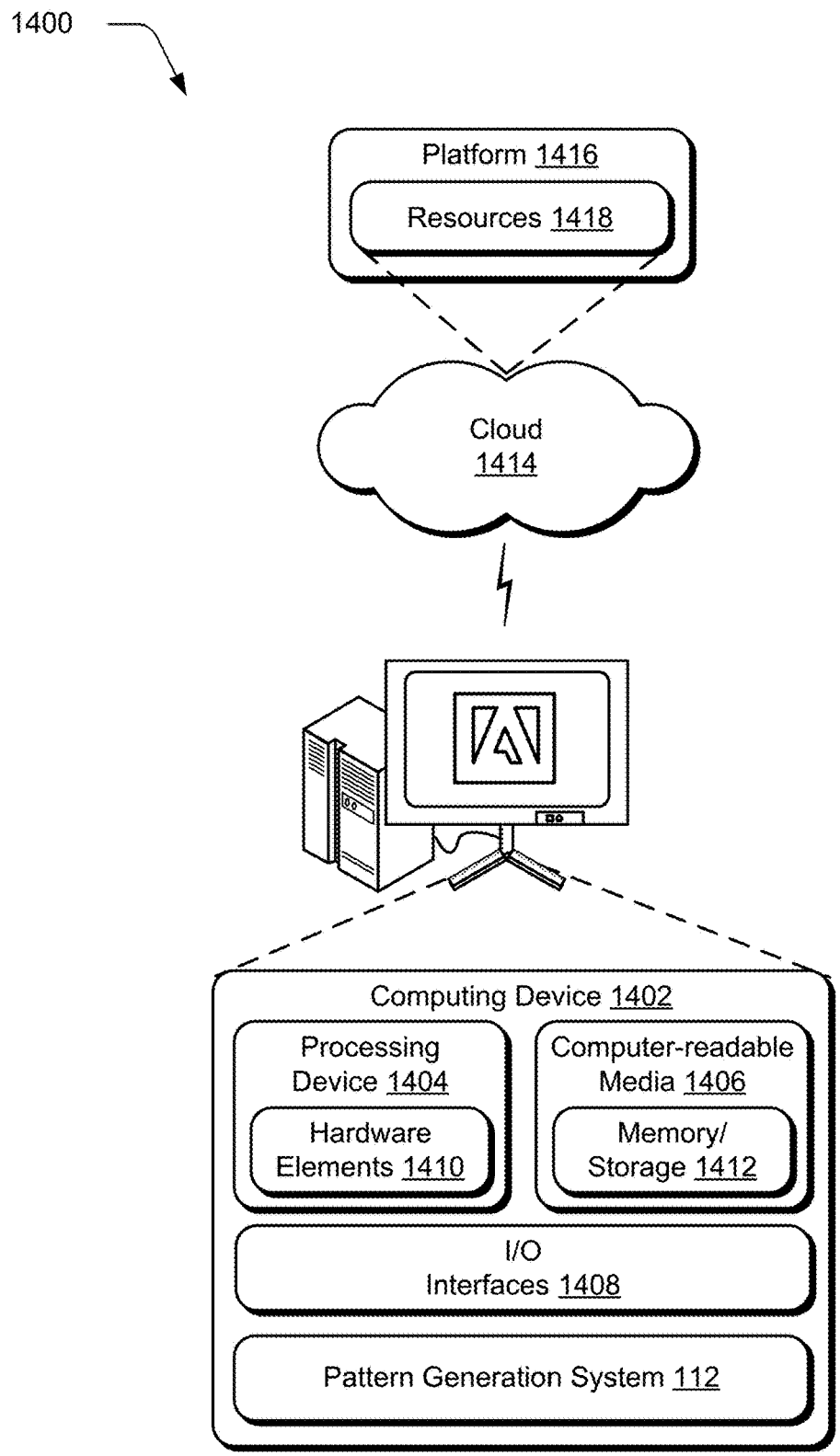
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that implement the various techniques described herein. This is illustrated through inclusion of the pattern generation system 112. The computing device 1402 is configurable, for example, as a server of a service provider, a device associated with a client (e.g., a client device), an on-chip system, and/or any other suitable computing device or computing system.

The example computing device 1402 as illustrated includes a processing device 1404, one or more computer-readable media 1406, and one or more I/O interface 1408 that are communicatively coupled, one to another. Although not shown, the computing device 1402 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1404 is representative of functionality to perform one or more operations using hardware. Accordingly, the processing device 1404 is illustrated as including hardware element 1410 that is configurable as processors, functional blocks, and so forth. This includes implementation in hardware as an application specific integrated circuit or other logic device formed using one or more semiconductors. The hardware elements 1410 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1406 is illustrated as including memory/storage 1412 that stores instructions that are executable to cause the processing device 1404 to perform operations. The memory/storage 1412 represents memory/storage capacity associated with one or more computer-readable media. The memory/storage 1412 includes volatile media (such as random access memory (RAM)) and/or nonvolatile media (such as read only memory (ROM), Flash memory, optical disks, magnetic disks, and so forth). The memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1402. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing device 1404. The instructions and/or functions are executable/operable by one or more articles of manufacture (for example, one or more computing devices 1402 and/or processing devices 1404) to implement techniques, modules, and examples described herein.

The techniques described herein are supported by various configurations of the computing device 1402 and are not limited to the specific examples of the techniques described herein. This functionality is also implementable all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 abstracts resources and functions to connect the computing device 1402 with other computing devices. The platform 1416 also serves to abstract scaling of resources to provide a corresponding level of scale to encountered demand for the resources 1418 that are implemented via the platform 1416. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    displaying, by a processing device, a live stream of digital images of a physical object in a user interface in real time as captured by an image capture device;
    receiving, by the processing device, an input via the user interface to initiate generation of a visual pattern;
    displaying, by the processing device, a real time preview of a plurality of visual patterns in the user interface generated based on the physical object as depicted in the live stream of digital images;
    receiving, by the processing device, a selection input via the user interface selecting a visual pattern from the real time preview of visual patterns; and
    storing, by the processing device, a vector pattern tile responsive to the selection input, the vector pattern tile generated from a visual pattern selected from the plurality of visual patterns displayed in the real time preview.

2. The method as described in claim 1, wherein the real time preview is generated and displayed as the digital images are captured by the image capture device.

3. The method as described in claim 1, further comprising generating, by the processing device, the plurality of visual patterns in real time from the digital images, each said visual pattern depicting the physical object.

4. The method as described in claim 1, wherein the generating the plurality of visual patterns in real time from the digital images includes:
    extracting shapes from the plurality of digital images; and
    generating the plurality of visual patterns, respectively, from the extracted shapes.

5. The method as described in claim 4, wherein the extracting the shapes includes:
    generating luminance values by converting color values from the plurality of digital images;
    generating edge detection data having gradients based on the luminance values;
    determining a direction and a magnitude of the gradients using a tensor calculation; and
    generating the extracted shapes based on a set of probabilities of edges for thresholding that are generated based on the determined direction and magnitude.

6. The method as described in claim 5, further comprising generating smoothed gradients from the gradients using a smoothing filter, and wherein the determining the direction and the magnitude of the gradients using the tensor calculation is performed using the smoothed gradients.

7. The method as described in claim 6, wherein the smoothing filter is a Gaussian filter.

8. The method as described in claim 5, further comprising smoothing, using a smoothing filter, the set of probabilities of edges for thresholding based on the determined direction and magnitude.

9. The method as described in claim 8, wherein the smoothing filter is a dilation filter.

10. The method as described in claim 4, wherein the generating the plurality of visual patterns from the extracted shapes further comprises:
    generating a pattern cell from the extracted shapes; and
    generating a respective said visual pattern as a repeated visual pattern based on the pattern cell.

11. The method as described in claim 10, wherein:
    the generating the pattern cell is performed using a pattern crop filter; and
    the generating the visual pattern is performed using a fragment shader.

12. The method as described in claim 10, wherein the visual pattern has a number of repetitions of the pattern cell based on a pattern input received via the user interface.

13. The method as described in claim 10, further comprising generating a vector pattern tile by vectorizing the pattern cell.

14. A computing device comprising:
    an image capture device;
    a display device;
    a processing device; and
    one or more computer-readable storage media storing instructions that, responsive to execution by the processing device, causes the processing device to perform operations including:
        capturing a plurality of digital images of a physical object by the image capture device;
        generating a plurality of pattern cells based on the physical object as depicted by the plurality of digital images;
        generating a plurality of repeating visual patterns of the physical object based on one or more of the plurality of pattern cells; and
        displaying the plurality of repeating visual patterns as a real time preview by the display device.

15. The computing device as described in claim 14, wherein the generating the plurality of pattern cells includes extracting shapes by:
    generating luminance values by converting color values from the plurality of digital images;
    generating edge detection data having gradients based on the luminance values;
    determining a direction and a magnitude of the gradients using a tensor calculation; and
    generating the extracted shapes based on a set of probabilities of edges for thresholding that are generated based on the determined direction and magnitude.

16. The computing device as described in claim 14, wherein:
    the generating the pattern cell is performed using a pattern crop filter; and
    the generating a visual pattern of the repeating visual pattern is performed using a fragment shader.

17. The computing device as described in claim 14, wherein the capturing, the generating the plurality of pattern cells, the generating the plurality of repeating visual patterns, and the displaying the plurality of repeating visual patterns as the real time preview by the display device are performed in real time as the plurality of digital images are captured.

18. The computing device as described in claim 14, wherein the operations further comprise generating a vector pattern tile by vectorizing the pattern cell.

19. One or more computer-readable storage media storing instructions that, responsive to execution by a processing device, causes the processing device to perform operations including:

generating luminance values by converting color values from digital images;
generating edge detection data having gradients based on the luminance values;
determining a direction and a magnitude of the gradients using a tensor calculation;
generating extracted shapes based on a set of probabilities of edges for thresholding that are generated based on the determined direction and magnitude;
generating a pattern cell from the extracted shapes; and
generating a repeated visual pattern based on the pattern cell.

20. The one or more computer-readable storage media as described in claim 19, further comprising generating a vector pattern tile by vectorizing the pattern cell.

* * * * *